United States Patent
Kawashima et al.

(10) Patent No.: US 7,889,647 B2
(45) Date of Patent: Feb. 15, 2011

(54) SWITCHING APPARATUS FOR SWITCHING REAL-TIME PACKET IN REAL TIME AND PACKET SWITCHING METHOD

(75) Inventors: Jun Kawashima, Setagaya-ku (JP); Kazuhiko Morimura, Ohta-ku (JP); Kenichi Morikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 517 days.

(21) Appl. No.: 11/075,592

(22) Filed: Mar. 9, 2005

(65) Prior Publication Data

US 2005/0207412 A1 Sep. 22, 2005

(30) Foreign Application Priority Data

Mar. 16, 2004 (JP) ............................... 2004-074175

(51) Int. Cl.
- *G01R 31/08* (2006.01)
- *H04J 3/16* (2006.01)
- *H04J 3/24* (2006.01)
- *G06F 15/16* (2006.01)

(52) U.S. Cl. ..................... 370/230; 370/235; 370/252; 370/471; 370/474; 709/232

(58) Field of Classification Search ......... 370/229–232, 370/237–238.1, 395.2, 395.3–395.43, 395.4, 370/395.41, 395.42, 395.52, 412, 414, 416, 370/418, 428–429, 474, 395.21, 235, 419, 370/471, 493, 509; 709/228–229, 232, 235

See application file for complete search history.

(56) References Cited

U.S. PATENT DOCUMENTS

| | | | |
|---|---|---|---|
| 5,557,608 A * | 9/1996 | Calvignac et al. ............ 370/389 |
| 6,192,404 B1 * | 2/2001 | Hurst et al. .................. 709/224 |
| 6,292,487 B1 | 9/2001 | Kunito et al. | |
| 6,456,967 B1 * | 9/2002 | Yeom ........................ 704/220 |
| 6,643,496 B1 * | 11/2003 | Shimoyama et al. .......... 455/69 |
| 6,700,888 B1 * | 3/2004 | Jonsson et al. .............. 370/392 |
| 6,760,309 B1 * | 7/2004 | Rochberger et al. ......... 370/235 |
| 6,853,625 B2 * | 2/2005 | Burmeister et al. ......... 370/252 |
| 7,031,322 B1 * | 4/2006 | Matsuo ..................... 370/395.4 |
| 7,126,918 B2 * | 10/2006 | Roberts ..................... 370/235 |
| 2002/0057695 A1 | 5/2002 | Kunito et al. | |
| 2003/0235209 A1 * | 12/2003 | Garg et al. .................. 370/468 |
| 2004/0010729 A1 * | 1/2004 | Lockridge et al. ........... 713/500 |
| 2004/0114516 A1 | 6/2004 | Iwata et al. | |
| 2005/0207406 A1 * | 9/2005 | Reme ........................ 370/389 |
| 2006/0112272 A1 * | 5/2006 | Morioka et al. ............. 713/171 |

FOREIGN PATENT DOCUMENTS

| | | |
|---|---|---|
| JP | H10-322343 A | 12/1998 |
| JP | H10-322352 A | 12/1998 |
| JP | 2002-016637 A | 1/2002 |
| JP | 2003-309832 A | 10/2003 |
| WO | WO 9852327 A2 * | 11/1998 |

* cited by examiner

*Primary Examiner*—Aung S Moe
*Assistant Examiner*—Redentor M Pasia
(74) *Attorney, Agent, or Firm*—Canon USA Inc IP Division

(57) ABSTRACT

A switching apparatus includes an identification device for identifying received real-time packets; a measurement device for measuring a reception interval of the real-time packets according to the identification identified by the identification device; and an output device for giving priority to the real-time packets over other types of packets and outputting the real-time packet by priority based on the measurement measured by the measurement device.

6 Claims, 7 Drawing Sheets

FIG. 1

TRANSMISSION DATA FROM STREAM SOURCE (CAMERA 1) (10)

TRANSMISSION DATA FROM ASYNCHRONOUS DATA SOURCE
(CONTROL TERMINAL A) (11)
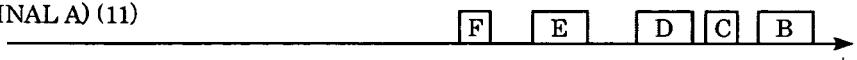

TRANSMISSION DATA FROM SW PORT (SW4) IN WHICH STREAM
IS INTEGRATED WITH ASYNCHRONOUS DATA (12)

ASYNCHRONOUS DATA TRANSMITTED FROM ANOTHER PORT (SW2) (13)
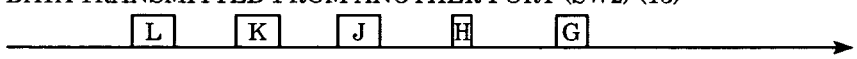

TRANSMISSION DATA FROM SW (SW1) IN WHICH ONE STREAM CHANNEL
IS COMBINED WITH TWO ASYNCHRONOUS DATA CHANNELS (14)

TRANSMISSION DATA FROM ASYNCHRONOUS TERMINAL (CONTROL
TERMINAL C) CONNECTED TO ANOTHER PORT (SW3) (15)
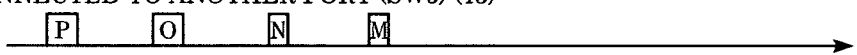

DATA RECEIVED BY STREAM RECEIVER (VIDEO OUTPUTTING APPARATUS 1) (16)

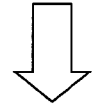

TRANSMISSION DATA FROM STREAM SOURCE (CAMERA 1) (21)

TRANSMISSION DATA FROM ASYNCHRONOUS DATA SOURCE
(CONTROL TERMINAL A) (22)

TRANSMISSION DATA FROM SW PORT (SW4) IN WHICH STREAM
IS INTEGRATED WITH ASYNCHRONOUS DATA (23)

ASYNCHRONOUS DATA TRANSMITTED FROM ANOTHER PORT (SW2) (24)
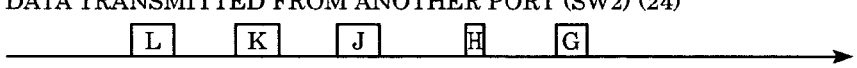

TRANSMISSION DATA FROM SW (SW1) IN WHICH ONE STREAM CHANNEL
IS COMBINED WITH TWO ASYNCHRONOUS DATA CHANNELS (25)

TRANSMISSION DATA FROM ASYNCHRONOUS TERMINAL (CONTROL
TERMINAL C) CONNECTED TO ANOTHER PORT (SW3) (26)
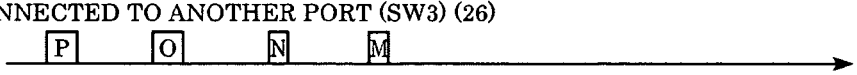

DATA RECEIVED BY STREAM RECEIVER (VIDEO OUTPUTTING APPARATUS 1) (27)

FIG. 3

TRANSMISSION DATA FROM STREAM SOURCE (CAMERA 1) (21)

I8 I7 I6 I5 I4 I3 I2 I1 → t

TRANSMISSION DATA FROM ASYNCHRONOUS DATA SOURCE (CONTROL TERMINAL A) (22)

F E D C B → t

- SW4 STARTS TO MEASURE RECEPTION INTERVAL OF STREAM DATA (35)
- SW4 DETERMINES STREAM CYCLE T BASED ON RECEPTION INTERVALS (36)
- SW4 EXPECTS THAT SUBSEQUENT REAL-TIME DATA PACKET IS TRANSMITTED AFTER T (37)
- SW4 EXPECTS THAT STREAM IS TRANSMITTED AT THIS TIMING AND INHIBITS TRANSMISSION OF RECEIVED ASYNCHRONOUS PACKET E (38)
- SW4 TRANSMITS E AFTER RECEIVING EXPECTED STREAM PACKET I3 AND TRANSMITTING I3 (39)

TRANSMISSION DATA FROM SW PORT (SW4) IN WHICH STREAM IS INTEGRATED WITH ASYNCHRONOUS DATA (23)

I8 I7 I6 I5 F I4 E I3 D C I1 B → t

ASYNCHRONOUS DATA TRANSMITTED FROM ANOTHER PORT (SW2) (24)

L K J H G → t

- SW1 STARTS TO MEASURE RECEPTION INTERVAL OF STREAM DATA (40)
- SW1 DETERMINES STREAM CYCLE T BASED ON RECEPTION INTERVALS (41)
- SW1 EXPECTS THAT SUBSEQUENT REAL-TIME DATA PACKET IS TRANSMITTED AFTER T (42)
- SW1 EXPECTS THAT STREAM IS TRANSMITTED AT THIS TIMING AND INHIBITS TRANSMISSION OF RECEIVED ASYNCHRONOUS PACKET J (43)
- SW1 TRANSMITS J AFTER RECEIVING EXPECTED STREAM PACKET I5 AND TRANSMITTING I5 (44)

TRANSMISSION DATA FROM SW (SW1) IN WHICH ONE STREAM CHANNEL IS COMBINED WITH TWO ASYNCHRONOUS DATA CHANNELS (25)

I8 L I7 K I6 J I5 F I4 H E I3 G I2 D C I1 B → t

TRANSMISSION DATA FROM ASYNCHRONOUS TERMINAL (CONTROL TERMINAL C) CONNECTED TO ANOTHER PORT (SW3) (26)

P O N M → t

- SW3 STARTS TO MEASURE RECEPTION INTERVAL OF STREAM DATA (45)
- SW3 DETERMINES STREAM CYCLE T BASED ON RECEPTION INTERVALS (46)
- SW3 EXPECTS THAT SUBSEQUENT REAL-TIME DATA PACKET IS TRANSMITTED AFTER T (47)
- SW3 EXPECTS THAT STREAM IS TRANSMITTED AT THIS TIMING AND INHIBITS TRANSMISSION OF RECEIVED ASYNCHRONOUS PACKET O (48)
- SW3 TRANSMITS O AFTER RECEIVING EXPECTED STREAM PACKET I7 AND TRANSMITTING I7 (49)

DATA RECEIVED BY STREAM RECEIVER (IMAGE OUTPUTTING APPARATUS 1) (27)

I8 L O I7 K N I6 J I5 M F I4 H E I3 G I2 D C I1 B → t

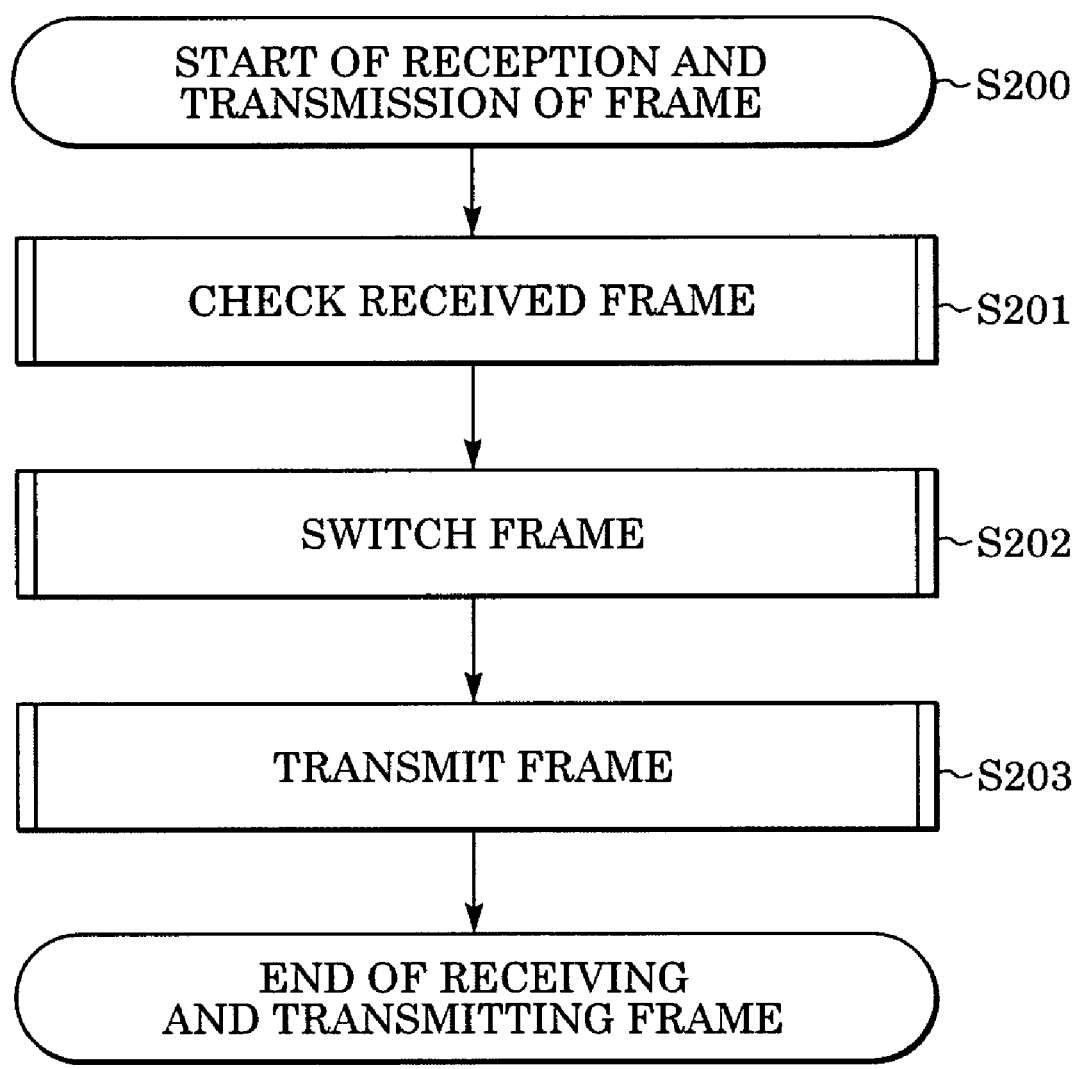

SWITCHING APPARATUS FOR SWITCHING REAL-TIME PACKET IN REAL TIME AND PACKET SWITCHING METHOD

BACKGROUND OF THE INVENTION

1. Field of the Invention

The present invention relates to a switching apparatus for switching real-time packets in real time and a packet switching method.

2. Description of the Related Art

In best effort networks adopting a carrier sense multiple access with collision detection (CSMA/CD) method or a full duplex method, demand for transmission of real-time data streams, such as sounds or videos, has been increased.

However, due to the characteristics of the best effort networks, it is difficult to reliably transmit a predetermined number of real-time streams (information) including videos or sounds within a predetermined time. This difficulty is a problem of assuring the quality of service (QoS) for real-time applications. This assurance is broadly divided into four aspects: that is, delay assurance, delay distribution assurance, bandwidth assurance, and packet loss assurance. In order to realize these aspects of the assurance, the following four technical elements (a) to (d) are provided.

(a) Classifier

Classifier is a method of grouping the traffic of received packets based on the source, destination, transmission control protocol/user datagram protocol (TCP/UDP) port number, and Type of Service (ToS) field in a router or a switch.

(b) Admission Control

Admission control is a method of controlling the reservation of resources for every session. Before a session is started, a resource on a path is reserved by a resource reservation setup protocol. When the reservation fails, the session is not started.

(c) Packet Scheduler

Packet scheduler is a method of adjusting the schedule of transmission of packets divided into groups. The packet scheduler is realized by various methods, such as a queuing method and a buffer control method.

(d) Traffic Shaper

Traffic shaper is a technique of smoothing input burst traffic in a constant rate.

Models for realizing these technical elements include integrated services (Int-serv), a resource reservation protocol (RSVP), and differentiated services (Diff-serv).

A network terminal that intends to process real-time stream data including sounds or videos makes reservation of a resource in a network or a network management entity according to procedures defined in the above models. The network that accepts the reservation performs the classifier, the admission control, and the packet scheduler, which are the technical elements described above, in a router or a switch in the network to try to ensure the QoS.

The network terminal must perform traffic shaping within the range of the reserved resource.

In order to ensure the delay distribution from the source to the destination of a real-time data packet in a switch in the network, that is, in order to limit the delay variation within a certain range, the technical elements including the classifier, the admission control, and the packet scheduler are necessary. The packet scheduler is, for example, a strict priority scheduler, a weighted fair queuing (WFQ) scheduler, or a deficit round robin (DRR) scheduler.

When the switch strictly and absolutely gives priority to the real-time stream data, the strict priority scheduler is used. In the strict priority scheduler, the switch must know the generation cycle and generation time of the real-time data packets by using some kind of means in order to reserve resources for the real-time data packets, which are periodically generated.

To this end, the generation cycle and generation time of the real-time data packets are set in advance in a normal switch, the switch acquires the information concerning the generation cycle and generation time of the packets in the switched real-time channels from the centralized management entity managing the real-time channels, or the switch acquires the information concerning the generation cycle and generation time of the real-time data packets from the terminal that generates the real-time stream at the start of the stream.

However, there is a problem in that a procedure in which the management entity manages the information concerning the entire network or each network switch and sets the information in the corresponding switch before or after the real-time stream is generated is very complicated, regardless of the size of the network. The information concerning the entire network includes the number of the real-time channels in the network and the path of the real-time channels. The information concerning each network switch includes the generation cycle and generation time of the real-time data packets.

SUMMARY OF THE INVENTION

The present invention provides a switching apparatus and a packet switching method, which are capable of switching of real-time packets in real time even when a network does not manage the real-time packets.

The present invention provides a switching apparatus and a packet switching method, which are capable of easily switching real-time packets in real time.

The present invention provides a switching apparatus and a packet switching method, which are capable of distributed control for real-time switching by switching the real-time packets in each apparatus.

According to an aspect of the present invention, a switching apparatus includes an identification device for identifying received real-time packets; a measurement device for measuring a reception interval of the real-time packets according to the identification identified by the identification device; and an output device for giving priority to the real-time packets over other types of packets and outputting the real-time packets by priority based on the measurement measured by the measurement device.

According to another aspect of the present invention, a switching apparatus includes an identification device for identifying received real-time packets; an output device for outputting a plurality of packets identified as the real-time packets by the identification device while keeping a transmission interval; and an adding device for adding, to the transmitted packets, information indicating that the transmission interval is kept if the packets are output from the output device while keeping the transmission interval.

According to still another aspect of the present invention, a packet switching method includes steps of identifying received real-time packets; measuring a reception interval of the real-time packets according to the identification identified in the identifying step; and giving priority to the real-time packets over other types of packets and outputting the real-time packets by priority based on the measurement measured in the measuring step.

According to yet another aspect of the present invention, a packet switching method includes steps of identifying received real-time packets; outputting a plurality of packets identified as real-time packets in the identifying step while keeping a transmission interval; and adding, to the transmitted packets, information indicating that the transmission interval is kept if the packets are output while keeping the transmission interval in the outputting step.

Further features and advantages of the present invention will become apparent from the following description of exemplary embodiments with reference to the attached drawings.

BRIEF DESCRIPTION OF THE DRAWINGS

FIG. 1 illustrates delays in packet streams according to an embodiment of the present invention.

FIG. 3 illustrates the operation of the network according to an embodiment.

FIG. 4 is a flowchart showing a process of receiving and transmitting a frame (packet) in a switch.

DESCRIPTION OF THE EMBODIMENTS

Embodiments of the present invention will be described below.

Figure 2:
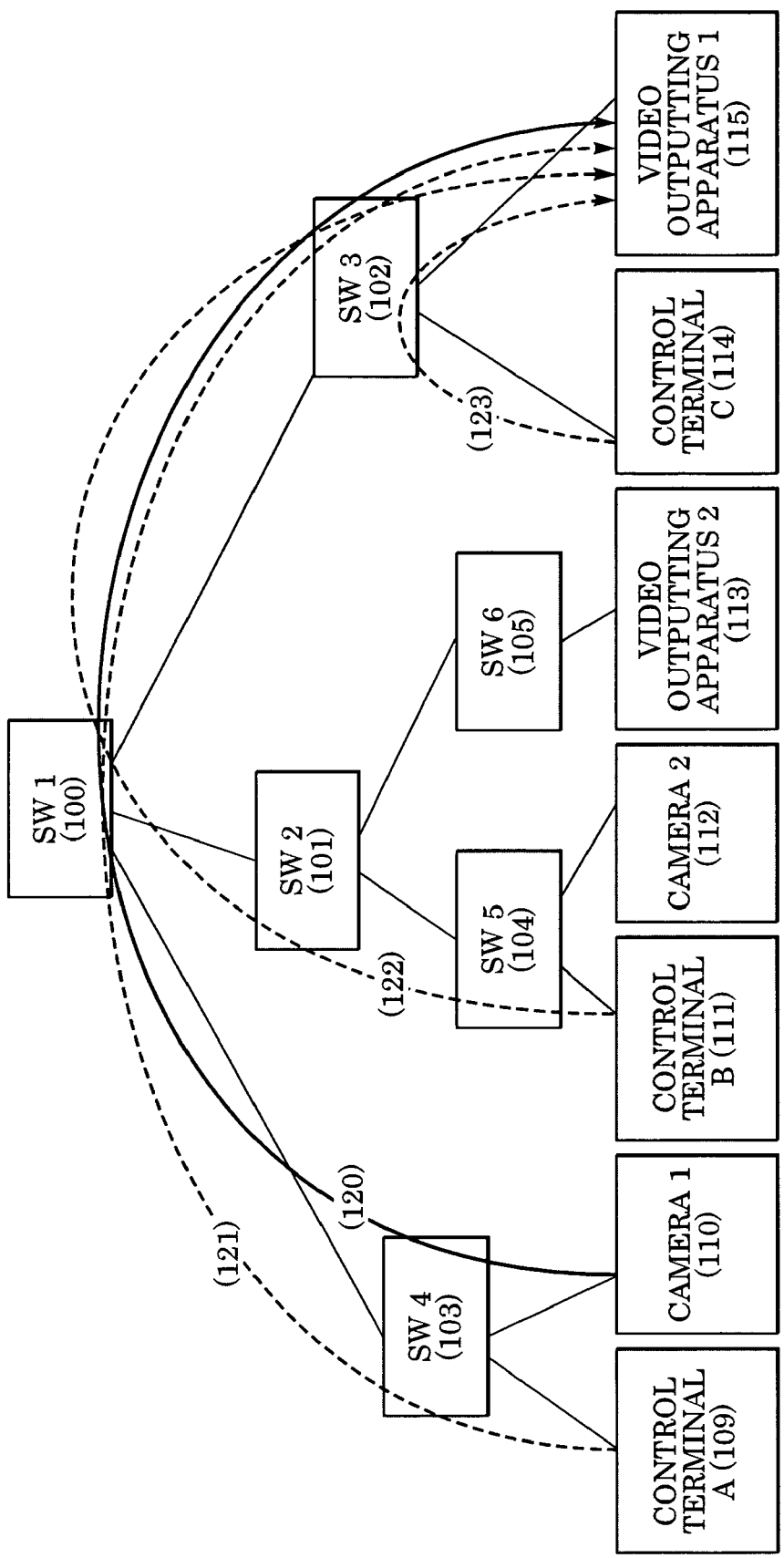
FIG. 2 illustrates the structure of a network according to an embodiment.

FIG. 2 illustrates the structure of a network according to an embodiment of the present invention.

Switches SW1 (100) to SW6 (105) are connected to other switches or various apparatuses. The switch SW1 (100) is connected to the switch SW2 (101), the switch SW3 (102), and the switch SW4 (103). A control terminal A (109) and a camera 1 (110) are connected to the switch SW4 (103). The switch SW5 (104) and the switch SW6 (105) are connected to the switch SW2 (101). A control terminal B (111) and a camera 2 (112) are connected to the switch SW5 (104). A video outputting apparatus 2 (113) is connected to the switch SW6 (105). A control terminal C (114) and a video outputting apparatus 1 (115) are connected to the switch SW3 (102).

The camera 1 (110) transmits a real-time video stream to the video outputting apparatus 1 (115) through a channel 120. The channel (120) passes through the switch SW4 (103), the switch SW1 (100), and the switch SW3 (102). The control terminal A (109) controls the video outputting apparatus 1 (115). Specifically, non-real-time data packets are frequently and asynchronously transmitted from the control terminal A (109) to the video outputting apparatus 1 (115) through a control channel (121).

The control channel (121) passes through the switch SW4 (103), the switch SW1 (100), and the switch SW3 (102). The video outputting apparatus 1 (115), which is controlled by multiple terminals, frequently and asynchronously receives non-real-time data packets from the control terminal B (111) and the control terminal C (114) through control channels (122) and (123) respectively. The control channel (122) passes through the switch SW5 (104), the switch SW2 (101), the switch SW1 (100), and the switch SW3 (102). The control channel (123) passes through the switch SW3 (102).

A conventional manner in which the propagation delay of real-time streams is caused in such a network environment will now be described.

FIG. 1 shows packet streams in the network according to the above embodiment.

Referring to FIG. 1, older packets are shown toward the right direction of each time axis and newer packets are shown toward the left direction thereof. Reference numerals I1 to I8 denote packets in a real-time stream and reference letters B, C, D, E, F, G, H, J, K, and L denote asynchronous packets.

Packets that keep the transmission cycle of data transmitted from the corresponding terminal are shaded (dot-filled), whereas packets that do not keep the transmission cycle are hatched.

A first line (10) in FIG. 1 shows a manner in which the camera 1 (110) transmits real-time stream data.

In the first line (10), the packets I1 to I8 in the real-time stream are periodically transmitted. A second line (11) in FIG. 1 shows a manner in which the control terminal A (109) transmits asynchronous control data.

In the second line (11), the asynchronous packets B, C, D, E, and F are transmitted. When the switch SW4 (103) receives the asynchronous packets and transmits the received asynchronous packets to the switch SW1 (100) on the channels (120) and (121) in the order of the reception, variations in the transmission interval of the real-time packets occur in parts where the asynchronous control packets temporally overlap with the real-time packets, among the packets transmitted from the control terminal A (109) and the camera 1 (110), as shown in a third line (12) of FIG. 1.

The phrase "variations in the transmission intervals of the real-time packets occur" means that the transmission intervals (cycles) are greatly varied. A phrase "variations in the reception intervals of the real-time packets occur" means that the reception intervals (cycles) are greatly varied.

In other words, the real-time packets I1 to I4 are affected by the asynchronous packets B, C, D, E, and F and, therefore, the data transmitted from the switch SW4 (103) cannot keep the transmission cycle of the data transmitted from the camera 1 (110). A packet sequence in a fifth line (14) of FIG. 1 shows a manner in which the switch SW1 (100) receives the packet sequence (12) transmitted from the switch SW4 (103) and a packet sequence (13) transmitted from the switch SW2 (101) and transmits the received packet sequences to the switch SW 3 (102) in the order of the reception.

In the fifth line (14), among the packets transmitted from the switch SW4 (103), the packets I5 to I7, which keep the transmission cycle, temporally overlap with the asynchronous packets J, K, and L transmitted from the switch SW2 (101). As a result, only the real-time packet I8 keeps the transmission cycle.

A seventh line (16) of FIG. 1 shows a packet sequence transmitted from the switch SW3 (102) to the video outputting apparatus 1 (115) when the packet sequence (14) is transmitted from the switch SW1 (100) to the switch SW3 (102) and the switch SW3 (102) transmits a packet sequence, shown in a sixth line (15) of FIG. 1, transmitted from the control terminal C (114).

In the seventh line (16), the real-time packet I8, which keeps the transmission cycle until it reaches the switch SW3 (102), temporally overlaps the asynchronous packet P transmitted from the control terminal C (114). As a result, no real-time packet that keeps the transmission cycle reaches the video outputting apparatus 1 (115).

There is no problem when the video outputting apparatus 1 (115) has a buffer that is large enough to be accommodated to the delay in the packets I1 to I8. In contrast, when the video outputting apparatus 1 (115) has no buffer that is large enough to be accommodated to the delay in the packets I1 to I8, buffer underrun or buffer overflow occurs and, therefore, normal video playback cannot be realized.

In such a case, when the non-real-time packets arrive first and the reception of the real-time packets is completed before the non-real-time packets are completely transmitted, the transmission of the real-time packets is delayed and, as a result, the transmission interval of the real-time packets is varied.

In order to avoid an occurrence of this situation, the switch must know the reception interval (transmission interval) of the real-time packets to avoid transmitting the non-real-time packets at estimated times when the real-time packets are to be transmitted. According to this embodiment, the transmission interval of the transmission data from the stream source is kept constant, as shown in the first line (10) of FIG. 1, in order to indicate the transmission interval of the real-time packets to the switch.

Specifically, the switch SW4 (103) to which the camera 1 (110) is directly connected receives the real-time packets from the camera 1 (110) at constant reception intervals. The switch SW4 (103) can determine a transmission cycle T by measuring the reception interval of the real-time packets from the camera 1 (110).

In other words, the switch SW 4 (103) can expect an arrival time of the subsequent real-time data packet I3 by measuring the reception interval between the real-time data packets I1 and I2 shown in the first line (10) of FIG. 1. The switch SW4 (103) inhibits the transmission of the non-real-time packets so as not to transmit the non-real-time packets at the transmission time of the real-time data packet I3 and transmits the real-time data packet I3 to be precedently transmitted ahead of the non-real-time packets.

A manner in which the real-time data packet is transmitted ahead of the non-real-time packets will now be described in detail.

FIG. 3 illustrates the operation of the network according to an embodiment of the present invention.

After the switch SW4 (103) to which the camera 1 (110) and the control terminal A (109) are directly connected receives the real-time data packet I1 from the camera 1 (110), the switch SW4 (103) starts to measure the time interval before the subsequent real-time data packet I2 is received (35).

Upon reception of the real-time data packet I2, the switch SW4 (103) determines a reception cycle T of the real-time data packets transmitted from the camera 1 (110) (36). The switch SW4 (103) expects that the subsequent real-time data packet is to be received after "the reception time of I2"+"the reception cycle T" (37).

Even if the switch SW4 (103) receives the non-real-time packet E from the control terminal A (109) at the reception time of the subsequent real-time data packet, the switch SW4 (103) does not immediately transmit the non-real-time packet E and inhibits the transmission of the non-real-time packet E (38). The switch SW4 (103) transmits the real-time data packet I3, which arrives at the switch SW4 (103) at the expected time, to the switch SW1 (100) and then transmits the non-real-time packet E (39). The transmission data (packet sequence) from a port of the switch SW4 (103) where the stream is integrated with the asynchronous data is shown in a third line (23) of FIG. 3.

In the packet sequence output from the switch SW4 (103), the first and second real-time data packets I1 and I2 can vary in the transmission cycle due to the effect of the asynchronous packet, whereas the third real-time data packet I3 does not vary in the transmission cycle.

A case in which asynchronous data transmitted from the control terminal B (111), which is connected to an extended channel of another port of the switch SW1 (100), is received by the switch SW1 (100), as shown in (24) in FIG. 3, when the transmission data (23) from the switch SW4 (103) where the stream is integrated with the asynchronous packets is transmitted to the switch SW1 (100), will now be described.

Among the real-time data packets received by the switch SW1 (100), the real-time data packets I1 and I2 are varied in the reception interval, whereas the real-time data packets subsequent to the real-time data packet I2 are not varied in the reception interval, as described above.

In principle, the switch SW1 (100) starts to measure the reception interval after the real-time data packet I3 is received (40). Upon reception of the real-time data packet I4, the switch SW1 (100) determines a reception cycle T of the real-time data packets (41). The switch SW1 (100) expects that the subsequent real-time data packet is to be received after "the reception time of I4"+"the reception cycle T" (42).

The switch SW1 (100) inhibits the transmission of the asynchronous packet so as not to transmit the asynchronous packet after the reception cycle T from the reception time of the real-time data packet I4 (43). The switch SW1 (100) transmits the asynchronous packet J after the switch SW1 (100) receives the expected real-time data packet I5 and transmits it to the switch SW3 (102) (44).

The packet sequence transmitted by the switch SW1 (100) to the switch SW3 (102) is shown in (25) as transmission data from the switch SW1 (100) where the one stream channel (120) is combined with the two asynchronous data channels (121) and (122).

Similarly, among the real-time data packets received by the switch SW3 (102), the real-time data packets I1, I2, I3, and I4 can vary in the reception interval, whereas the real-time data packets subsequent to the real-time data packet I4 do not vary in the reception interval.

Accordingly, the switch SW3 (102) starts to measure the reception interval of the real-time data packets after the real-time data packet I5 is received (45). Upon reception of the real-time data packet I6, the switch SW3 (102) determines a reception cycle T of the real-time data packets (46). The switch SW3 (102) expects that the subsequent real-time data packet I7 is to be received after "the reception time of I6"+"the reception cycle T" (47). The switch SW3 (102) inhibits transmission of the non-real-time packet O received around the reception time of the real-time data packet I7 (48). The switch SW3 (102) transmits the non-real-time packet 0 after receiving and transmitting the real-time data packet I7 (49).

As a result, among the real-time data packets received by the video outputting apparatus 1 (115) connected to the switch SW3 (102), the real-time data packets I1, I2, I3, I4, I5, and I6 vary in the reception interval, whereas the real-time data packets subsequent to the real-time data packet I6 do not vary in the reception interval. The packet sequence received by the video outputting apparatus 1 (115) is shown in (27) as data received by the stream receiver.

In the detection of the transmission cycle of the real-time data packets in the network switches described above with reference to FIG. 3, a criterion by which a network switch determines what number of the real-time data packets does not vary in the reception cycle T to start the measurement of the reception interval T is not established.

According to this embodiment, the criterion is established according to the following policies:

Policy (1) Real-time data packets that do not vary in the transmission cycle T are the N*2+1-th real-time data packet and the subsequent packets in a switch, where N denotes the number of switches between the switch and the stream source.

Policy (2) When the received real-time stream frame (packet) has a mark indicating the transmission cycle is kept, the frame having the mark and the subsequent frames are assumed that they do not vary in the transmission cycle T.

A flowchart in which a switch starts to measure a transmission cycle T of the real-time data packets and determines the transmission cycle T according to an embodiment will be described.

First, reception and transmission of frame (packet) in a general switch will now be described.

FIG. 4 is a flowchart showing a process of receiving and transmitting a frame (packet) in a general switch.

After the switch receives a packet, in Step S201, the switch checks the content of the received packet. Typically, the switch checks a media access control (MAC) address of a source and a MAC address of a destination to determine which port the terminal having the destination MAC address is connected to. In Step S202, the switch switches the packet to the determined port. When the packet to be transmitted is put in a transmission data queue in the port, in Step S203, the switch transmits the packet.

In this flowchart, the detection of the reception cycle of the real-time data packets according to this embodiment is mainly performed in the checking of the content of the received packet (Step S201). The detection of the reception cycle in the checking of the content of the received packet (Step S201) will now be described.

Figure 5:
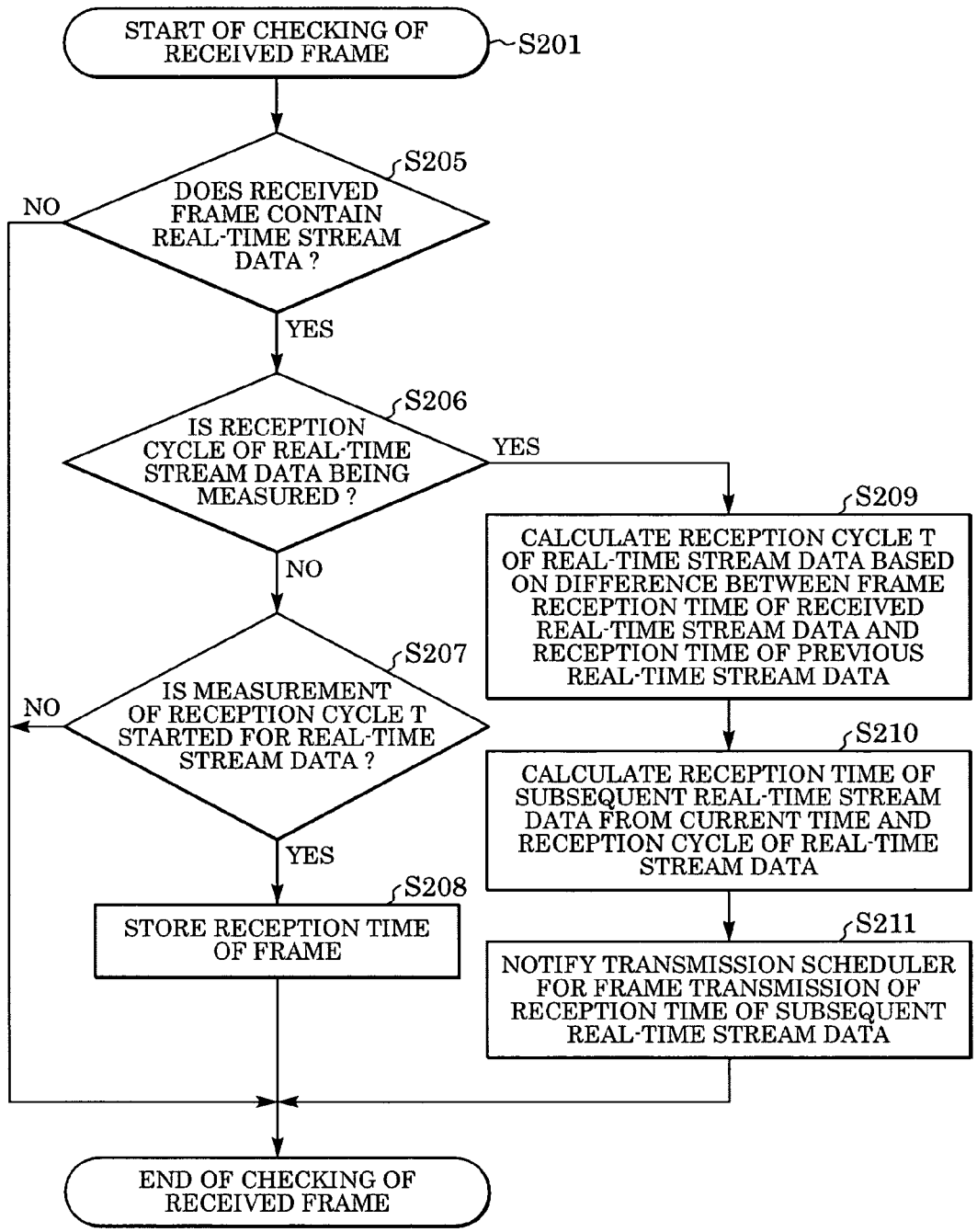
FIG. 5 is a flowchart showing a process relating to detection of a reception cycle in checking of the content of a received packet according to an embodiment.

FIG. 5 is a flowchart showing a process relating to the detection of the reception cycle in the checking of the content of the received packet (Step S201).

In Step S201, the checking of the received packet is started. In Step S205, the process determines whether the received packet contains real-time stream data. In order to determine whether the received packet is a real-time data packet, the packet needs a flag for identifying the packet as a real-time data packet or a non-real-time data packet. This flag is attached by a device in the source of the real-time data packet.

If the process determines that the packet is not a real-time data packet in Step S205, the checking of the content of the received packet for the detection of the reception cycle is finished.

If the process determines that the packet is a real-time data packet in Step S205, then in Step S206, the process determines whether the reception cycle of the real-time stream data is being measured. If the reception of the real-time stream data is not being measured, in Step S207, the process determines whether measurement of a reception cycle T is started for the real-time data packet. If the measurement of the reception cycle T is not started, the checking of the content of the received packet for the detection of the reception cycle is finished. On the other hand, if the measurement of the reception cycle T is started, in Step S208, the process stores the reception time of the stream.

If in Step S206 it is determined that the reception cycle of the real-time stream data is being measured, then in Step S209, the process calculates a reception cycle T of the real-time stream data based on a difference between the packet reception time of the received real-time stream data and the reception time of the previous real-time stream data. In Step S210, the process calculates the reception time of the subsequent real-time stream data based on the current time and the reception cycle of the real-time stream data. After the reception cycle T is calculated, in Step S211, the process notifies a transmission scheduler for the frame transmission of the reception time of the subsequent real-time stream data and requests the transmission scheduler to inhibit the transmission of the non-real-time stream data so as not to transmit the non-real-time stream data through the transmission port at the reception time of the subsequent real-time stream data.

The determination of whether the measurement of the reception cycle T is started for the real-time data packet (Step S207) will now be described in detail.

Figure 6:
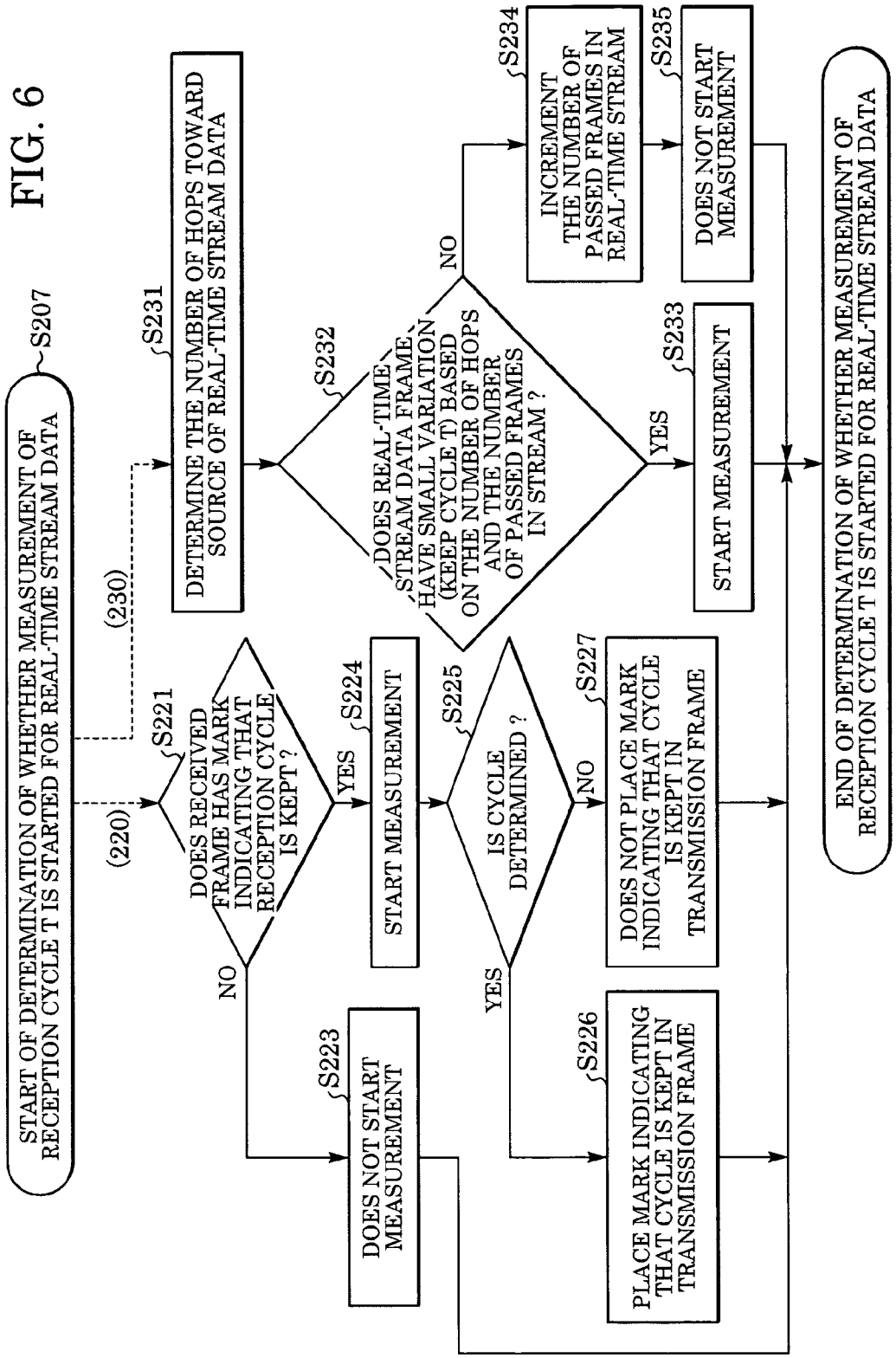
FIG. 6 is a flowchart showing a process of determining whether measurement of a reception cycle is started for a stream packet according to an embodiment.

FIG. 6 is a flowchart showing the process of determining whether the measurement of the reception cycle T is started for the real-time data packet (Step S207).

After the network switch receives the real-time data packet, in Step S207, the process determines whether the measurement of the reception cycle T is started for the real-time data packet. If the number of hops (the number of switches passed through) from the source of the real-time stream data is known in the switch (230), in Step S231, the process determines the number of hops toward the source of the real-time stream data.

The number of hops can be determined, for example, by using a traceroute command, by setting the number of switches from the source terminal to the switch in the switch in advance, or by detection of the number of hops by the switch using a predetermined protocol.

In Step S232, the process determines whether the real-time stream data frame has small variation (keeps the reception cycle T) based on the number of switches and the number of passed frames in the stream. When the number of switches between the switch and the real-time stream source terminal, acquired by using the method described above, is N, it is determined that the N*2+1-th packet and the subsequent packets do not vary in the reception cycle, as shown in FIG. 3. Accordingly, in Steps S234 and S235, the process passes the packets while incrementing the number of passed packets in the real-time stream until the switch receives the N*2+1-th packet.

If the switch receives the N*2+1-th packet, that is, if the switch determines that the real-time stream data frame has small variation (keeps the reception cycle T) in Step S232, then in Step S233, the process starts to measure a time interval between the reception time of the received packet and the reception time of the subsequent packet. Although the measurement may be started after the determination of whether the time interval is measured, it is preferable that the measurement be started upon reception of the real-time packet and that determination of whether the measurement is effective is performed based on the condition of starting the measurement shown here in order to more precisely measure the reception cycle. After the switch receives the subsequent real-time packet, the switch can determine the reception cycle T of the real-time packets.

If the number of switches between the switch and the real-time stream source is unknown (220), in Step S221, the switch that receives the packet determines whether the received frame has a mark indicating that the reception cycle is kept. In this case, it is assumed that the terminal that transmits the stream or the switch puts in the packet the mark indicating the transmission cycle is kept if the terminal or the switch determines that the transmission cycle of the real-time data packets is kept. If the received frame does not have the mark indicating that the reception cycle is kept in Step S221, then in Step S223, the process does not start measurement of the reception cycle T. If the received frame has the mark indicating that the reception cycle is kept in Step S221, then in Step S224, the process starts the measurement of the reception cycle T.

After measurement is started in Step S224, then in Step S225, the switch determines whether the reception cycle is established. If the switch determines that the reception cycle is established, in Step S226, the process puts in the transmission frame the mark indicating that the transmission cycle set for the real-time data packet in advance is kept. If the switch determines that the reception cycle is not established in Step S225, then in Step S227, the process does not put in the transmission frame the mark indicating that the transmission cycle is kept and continues the transmission for packet switching.

According to this embodiment, the mark indicating the transmission cycle (reception cycle) is kept is put in the Length/Type field in the MAC frame.

When it is possible to put the mark in the IP header of the corresponding switch, the mark may be put in the Type of Service (ToS) field of the IP header. When an identifier indicating the packet is a real-time packet or a non-real-time packet is added to the header, the identifier and the flag indicating the transmission cycle is kept occupy two bits in the Length/Type field or ToS field. However, when a port number or payload is used to determine whether the packet is a real-time packet or a non-real-time packet, this occupation does not occur.

The mark indicating the transmission cycle is kept may be put or removed in different manners depending on the configuration of the network system. First, the terminal puts the mark indicating that the transmission cycle is kept and, then, the switch removes the mark before the periodicity is ensured and puts the mark after the periodicity is ensured. Alternatively, the terminal does not put the mark and the switch directly connected to the terminal puts the mark after the switch confirms the periodicity of the packets or after the switch determines the reception cycle T if the switch can apparently determine that the periodicity of the packets is kept, without confirming the periodicity of the packets, because the switch is directly connected to the terminal.

Packet sequences transmitted from the network nodes, when the system shown in FIG. 2 is operated by using the switches according to the above embodiments, will now be described with reference to the lower half of FIG. 1.

A manner in which the camera 1 (110) transmits real-time stream data is shown in (21) in FIG. 1.

In (21), the packets I1 to I8 in the real-time stream are periodically transmitted. A manner in which the control terminal A (109) transmits asynchronous control data is shown in (22) in FIG. 1.

In (22), the asynchronous packets B, C, D, E, and F are transmitted. Since a transmission cycle T between the real-time data packets is established in the switch SW4 (103) based on the real-time data packets I1 and I2, it is estimated that the packet I3 is to be received after the transmission cycle T from the reception time of the packet I2 and the transmission resource is reserved for the packet I3.

Accordingly, as shown in (23) in FIG. 1, the transmission cycle of the real-time data packets I3, I4, I5, I6, I7, I8, . . . is kept in the packet sequence transmitted from the switch SW4 (103), as in the stream transmission terminal.

A manner in which the switch SW1 (100) receives the packet sequence transmitted from the switch SW4 (103) and asynchronous data (24) transmitted from the switch SW2 (101) and transmits the packet sequence to the switch SW3 (102) is shown in (25) in FIG. 1.

The switch SW1 (100) starts to measure a transmission cycle T of the packets subsequent to the packet I2. Since it is determined, on reception of the packet I4, that the subsequent packet I5 is to be received after the transmission cycle T from the reception time of the packet I4, the transmission cycle of the real-time data packets I5, I6, I7, I8, . . . is kept, as in the stream transmission terminal.

The switch SW1 (100) transmits the packet sequence (25) to the switch SW3 (102). When the control terminal C (114) connected to the switch SW3 (102) transmits a packet sequence shown in (26), the switch SW3 (102) transmits a packet sequence shown in (27) to the video outputting apparatus 1 (115).

The switch SW3 (102) starts to measure a reception cycle T after receiving the packet I5, determines the reception cycle T upon reception of the packet I6, and receives the packet I7 after the reception cycle T from the reception time of the packet I6.

Since the switch SW3 (102) reserves the transmission resource for the packet I7 at the reception time of the packet I7, the transmission cycle of the real-time data packets I8, I9, . . . is kept, as in the stream transmission terminal.

According to this embodiment, it is assumed that the camera 1 (110), which is the real-time stream source, transmits dummy real-time data packets corresponding to the number of switches in the switch network before transmitting a real-time data packet containing actual real-time data.

In other words, although the real-time data packets I1 to I6, which are transmitted first by the camera 1 (110), keep the transmission cycle, the packets contain the dummy data.

Accordingly, even if the real-time data packets I1 to I6, which are received by the video outputting apparatus 1 (115) at the reception side and which have a variation in the transmission cycle, are discarded, there is no problem in the system. The real-time data packets subsequent to the real-time data packet I6, which are received later by the video outputting apparatus 1 (115) at the reception side and into which the camera 1 (110) at the transmission side enters real data, keep the cycle T when the video outputting apparatus 1 (115) receives the packets. Hence, there is no need to provide a special buffer for absorbing variations in the transmission delay in the video output. In addition, only providing a very small buffer allows videos to be played back normally.

Figure 7:
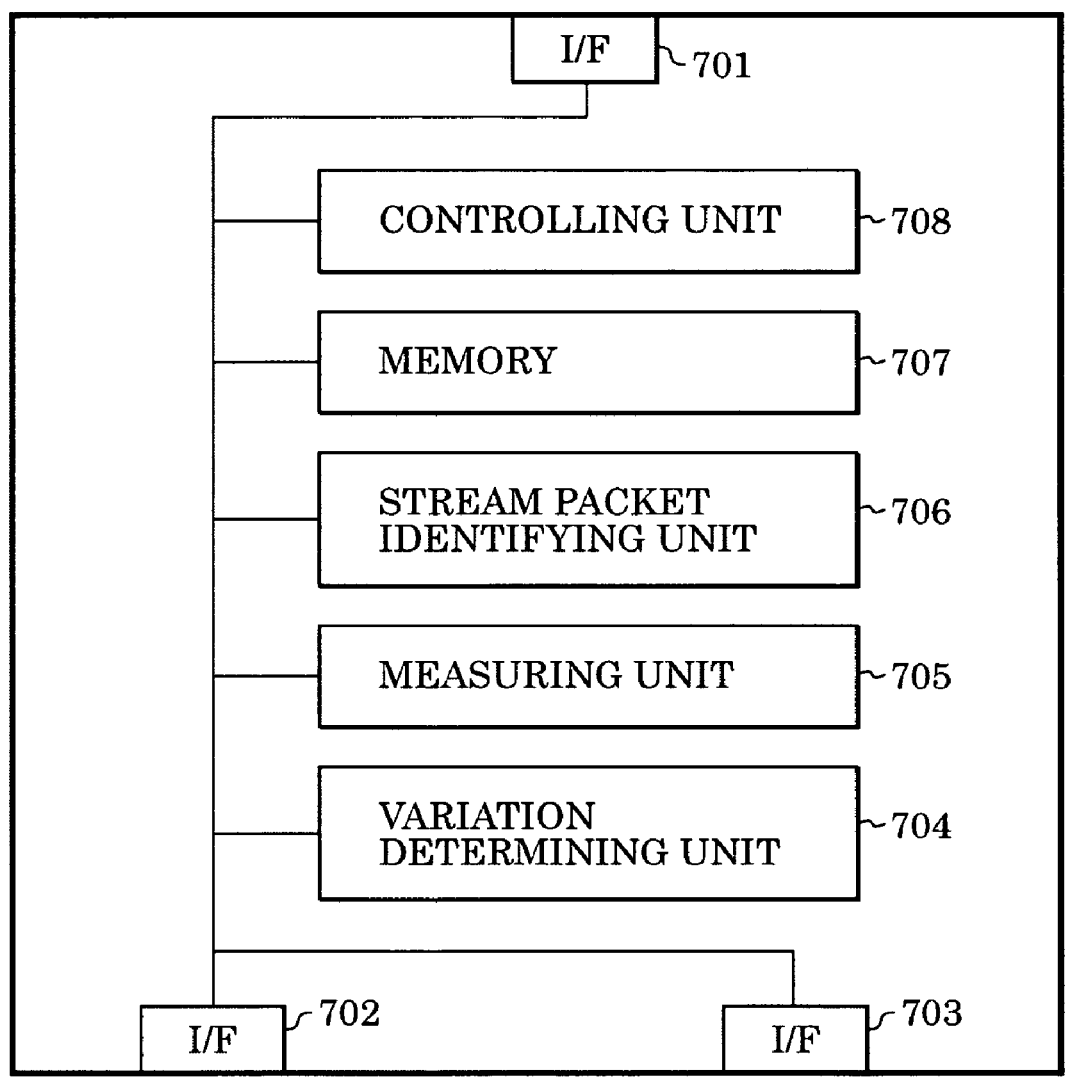
FIG. 7 shows the structure of a switch according to an embodiment.

FIG. 7 shows the structure of each of the switches SW1 to SW6 performing the above process.

Referring to FIG. 7, interfaces (I/F) 701, 702, and 703, through which the switch is connected to other devices or switches, are used to transmit and receive packets (frames) to and from the destination. A variation determining unit 704 determines whether the received packet is a packet that has a variation in the reception cycle or a packet that does not have a variation in the reception cycle based on the policy (1) or (2) described above under the control of a controlling unit 708. A measuring unit 705 measures a reception interval between the packets determined by the variation determining unit 704 as the packets that do not have a variation in the reception cycle under the control of the controlling unit 708. A stream packet identifying unit 706 determines whether the packets received through the interfaces 702 and 703 are real-time data packets. A memory 707 stores one or more programs used by the controlling unit 708 to perform various controls and temporarily stores the packets received through the interfaces 701 and 702 until the packets are transmitted through the interface 701. The controlling unit 708 controls the overall switch. Specifically, the switches SW1 to SW6 perform the various controls described in the above embodiments under the control of the controlling unit 708. The controls include the transmission and reception of the packets through the interfaces, the control of the variation determining unit 704, the control of the measuring unit 705, the control of the stream packet identifying unit 706, the determination of the number of switches (the number of hops) between the switch and the stream transmission terminal, and the putting of the mark indicating that the reception cycle of the packets is kept.

As described above, according to the present invention, there is no need for the network to control the real-time connection (channels), and each of the switches can transmit the real-time data packets in real time.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-074175 filed Mar. 16, 2004, which is hereby incorporated by reference herein.

What is claimed is:

1. A switching apparatus comprising:
   a determination device for determining whether or not received packets are real-time packets;
   a detection device for detecting real-time packets that do not vary from a transmission cycle of the real-time packets by a source apparatus and that are keeping the transmission cycle of the real-time packets by the source apparatus, among the real-time packets determined by the determination device;
   a measurement device for measuring a reception cycle between the real-time packets that do not vary based on a reception time of a real-time packet that does not vary and a next reception time of a next real-time packet that does not vary;
   an expecting device for expecting reception timings that subsequent real-time packets that do not vary are to be received based on the reception cycle measured by the measurement device;
   an inhibiting device for inhibiting a transmission of non-real-time packets, so as not to transmit the non-real-time packets at the reception timings expected by the expecting device; and
   a switching device for switching a series of real-time packets that do not vary after measurement by the measurement device at the transmission cycle that is keeping the transmission cycle of the real-time packets by the source apparatus.

2. The switching apparatus according to claim 1,
   wherein the detection device detects the real-time packets that do not vary based on the number of other switching apparatuses between the switching apparatus and the source apparatus.

3. The switching apparatus according to claim 1
   wherein the detection device detects the real-time packets that do not vary based on information added to the received packets,
   wherein the information is information of a Length/Type field in a MAC frame.

4. The switching apparatus according to claim 1, further comprising:
   an adding device for adding, to the packets switched by the switching device, information indicating that the transmission cycle is kept.

5. The switching apparatus according to claim
   wherein the switching device switches the non-real-time packets after switching the real-time packets.

6. A packet switching method comprising steps of:
   determining whether or not received packets are real-time packets;
   detecting real-time packets that do not vary from a transmission cycle of the real-time packets by a source apparatus and that are keeping the transmission cycle of the real-time packets by the source apparatus, among the real-time packets determined in the determination step;
   measuring a reception cycle between the real-time packets that do not vary based on a reception time of a real-time packet that does not vary and a next reception time of a next real-time packet is that does not vary;
   causing an expecting device to expect reception timings that subsequent real-time packets that do not vary are to be received based on the reception cycle measured in the measuring step;
   inhibiting a transmission of non-real-time packets, so as not to transmit a the non-real-time packets at the reception timings expected by the expecting device; and
   switching a series of real-time packets that do not vary after measurement in the measuring step at the transmission cycle that is keeping the transmission cycle of the real-time packets by the source apparatus.

* * * * *